(12) United States Patent
Tanaka et al.

(10) Patent No.: US 11,554,760 B2
(45) Date of Patent: Jan. 17, 2023

(54) BRAKE SYSTEM

(71) Applicant: HITACHI CONSTRUCTION MACHINERY CO., LTD., Tokyo (JP)

(72) Inventors: Takaaki Tanaka, Ushiku (JP); Takanobu Ikari, Tsuchiura (JP); Yasutaka Tsuruga, Ryugasaki (JP); Takayuki Sato, Kashiwa (JP); Takashi Sasaki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 810 days.

(21) Appl. No.: 16/490,249

(22) PCT Filed: Jul. 27, 2018

(86) PCT No.: PCT/JP2018/028237
§ 371 (c)(1),
(2) Date: Aug. 30, 2019

(87) PCT Pub. No.: WO2019/022229
PCT Pub. Date: Jan. 31, 2019

(65) Prior Publication Data
US 2020/0010060 A1    Jan. 9, 2020

(30) Foreign Application Priority Data
Jul. 28, 2017    (JP) ............................. JP2017-146503

(51) Int. Cl.
*B60T 7/16*        (2006.01)
*B60T 13/14*       (2006.01)
(Continued)

(52) U.S. Cl.
CPC .............. *B60T 7/16* (2013.01); *B60T 13/14* (2013.01); *B60T 13/68* (2013.01); *B60T 17/18* (2013.01); *F15B 20/00* (2013.01)

(58) Field of Classification Search
CPC . B60T 13/68; B60T 7/16; B60T 13/14; B60T 17/18; B60T 7/02; B60T 7/12; B60T 13/662; F15B 20/00; F16K 31/06
See application file for complete search history.

(56) References Cited

U.S. PATENT DOCUMENTS

2009/0309412 A1    12/2009 Meier
2011/0257861 A1    10/2011 Uematsu et al.
(Continued)

FOREIGN PATENT DOCUMENTS

DE    102014108555 A1 * 12/2015 ............ B60T 13/268
DE    102018121957 A1 *  3/2020 ............ B60T 13/683
(Continued)

OTHER PUBLICATIONS

DE-102018121957-A1 English translation; PE2E Sep. 10, 2022.*
(Continued)

*Primary Examiner* — Jelani A Smith
*Assistant Examiner* — Paul A Castro
(74) *Attorney, Agent, or Firm* — Mattingly & Malur, PC

(57) ABSTRACT

An automatic brake subsystem (24) includes second accumulators (25F, 25R), a front second line (28) and a rear second line (29), second brake valves (30F, 30R), a first solenoid switching valve (32), first shuttle valves (33F, 33R), and a controller 37. A second solenoid switching valve (34F) and a pressure sensor (35F) are provided in the front second line (28), and a second solenoid switching valve (34R) and a pressure sensor (35R) are provided in the rear second line (29). In a case where it is determined that each of the second brake valve (30F, 30R) is not performing normally based upon a pressure of a hydraulic fluid detected by each of the pressure sensors (35F, 35R) and an operating signal supplied to the first solenoid switching valve (32) or each of the second brake valves (30F, 30R), a controller 37

(Continued)

performs control to switch each of the second solenoid switching valves (34F, 34R).

2 Claims, 7 Drawing Sheets

(51) Int. Cl.
    *B60T 13/68*           (2006.01)
    *B60T 17/18*           (2006.01)
    *F15B 20/00*          (2006.01)

(56) References Cited

U.S. PATENT DOCUMENTS

2014/0110995 A1     4/2014    Meeitinger et al.
2014/0367189 A1*  12/2014   Minoshima .......... B62D 15/021
                                                  180/422

FOREIGN PATENT DOCUMENTS

JP            59-40161 U      3/1984
JP        2011-213347 A    10/2011

OTHER PUBLICATIONS

DE-102014108555-A1 English translation: PE2E; Sep. 10, 2022.*
International Search Report of PCT/JP2018/028237 dated Sep. 11, 2018.

* cited by examiner

BRAKE SYSTEM

TECHNICAL FIELD

The present invention relates to a brake system that is used, for example, in a dump truck transporting crushed stones excavated in a mine or the like.

BACKGROUND ART

In general, a dump truck as a representative example of a large-sized haulage vehicle is used suitably for transporting crushed stones or sand and earth excavated in a mine or the like. In a case where an operator drives the dump truck, since labor costs thereof are high, it has been recently focused on an automatic driving of a dump truck that makes the operator unnecessary. In the dump truck that performs the automatic driving, it is required to automatically perform deceleration and stop of a vehicle. Therefore, there is proposed an automatic brake system for use in such a dump truck.

Here, there is proposed a brake system that is mounted on a vehicle in which an operator gets and controls a brake pressure using a solenoid pressure-reducing valve. The brake system according to this conventional technology is configured such that a controller outputs an operating signal to the solenoid pressure-reducing valve in response to a brake operation of the operator to control an operation of the solenoid pressure-reducing valve. Thereby, the brake pressure to be supplied to a brake is controlled. In addition, this brake system is configured such that a solenoid switching valve for backup is provided in parallel with the solenoid pressure-reducing valve, and in a case where the solenoid pressure-reducing valve is in failure, the brake pressure is supplied through the solenoid switching valve to the brake (Patent Document 1).

PRIOR ART DOCUMENT

Patent Document

Patent Document 1: US Patent Laid-Open No. 2009/0309412 A

SUMMARY OF THE INVENTION

However, the brake system according to the conventional technology cannot supply the brake pressure mechanically to the brake by the brake operation of the operator. Therefore, for example, in a case where the automatic driving of the dump truck cannot be performed due to the maintenance, failure or the like, the braking of the dump truck cannot be performed even when the operator tries to drive the dump truck.

In addition, the brake system according to the conventional technology is configured to control the brake pressure to be supplied to the brake by the solenoid pressure-reducing valve. Therefore, just in case where the solenoid pressure-reducing valve is in failure, a brake operation is possibly performed without corresponding to the operating signal from the controller. Further, the hydraulic fluid to be supplied to the brake is leaked into a tank from the solenoid pressure-reducing valve, possibly causing the brake pressure to be reduced.

The present invention is made in view of the problems in the conventional technology as described above, and an object of the present invention is to provide a brake system that can enhance reliability of an automatic brake subsystem.

The present invention is applied to a brake system comprising an engine mounted on a vehicle body, a manned brake subsystem performing a braking of the vehicle body with an operation of an operator, and an automatic brake subsystem performing the braking of the vehicle body without through the operator, wherein the manned brake subsystem includes a fluid pump driven by the engine, a first accumulator accumulating a hydraulic fluid to be supplied from the fluid pump, a brake operated by the hydraulic fluid accumulated in the first accumulator, a first brake valve that is provided in a first line for connection of the brake and the first accumulator and controls supply and discharge of the hydraulic fluid from the first accumulator toward the brake, and a brake pedal operated to open and close the first brake valve, and the manned brake subsystem operates the brake in response to the operation of the operator, and the automatic brake subsystem includes a second accumulator accumulating the hydraulic fluid to be supplied from the fluid pump, a second brake valve that is provided in a second line for connection of the brake and the second accumulator and controls supply and discharge of the hydraulic fluid from the second accumulator toward the brake, a first solenoid switching valve that is connected to the second accumulator to be in parallel with the second brake valve and controls supply and discharge of the hydraulic fluid between the second accumulator and the brake, a control device configured to control operations of the second brake valve and the first solenoid switching valve, and a control brake selective valve that selects a hydraulic fluid higher in pressure out of hydraulic fluids to be supplied from the second brake valve and the first solenoid switching valve to be outputted to the brake, and the automatic brake subsystem operates the brake in response to an operating signal from the control device.

The present invention is characterized in that a second solenoid switching valve is provided between the second accumulator and the second brake valve in the second line to connect the second brake valve and any one of the second accumulator and a tank of hydraulic fluid, and a pressure detector is provided between the control brake pressure selective valve and the brake in the second line to detect a pressure of the hydraulic fluid, wherein when the pressure of the hydraulic fluid detected by the pressure detector is equal to or more than a brake operating pressure in which the brake operates in a state where an operating signal for valve closing is supplied to the second brake valve, and when the pressure of the hydraulic fluid detected by the pressure detector is less than the brake operating pressure in a state where an operating signal for valve opening is supplied to the second brake valve, the control device performs control to switch the second solenoid switching valve to a position in which the second brake valve is disconnected from the second accumulator and is connected to the tank.

According to the present invention, when the pressure of the hydraulic fluid is equal to or more than the brake operating pressure in the state where the operating signal for valve closing is supplied to the second brake valve, and when the pressure of the hydraulic fluid is less than the brake operating pressure in the state where the operating signal for valve opening is supplied to the second brake valve, the second brake valve is disconnected from the second accumulator by the second solenoid switching valve and is connected to the tank. Accordingly, the hydraulic fluid from the second accumulator is not supplied through the second brake valve to the brake. Thereby, it is possible to suppress the unintended braking from being applied by an abnormal operation of the second brake valve. In addition, the hydraulic fluid from the second accumulator can be suppressed from flowing out into the tank or the like from the second brake valve to keep the pressure of the hydraulic fluid. As a result, it is possible to enhance reliability of the automatic brake subsystem.

Further, since the maned brake subsystem is mounted, even when the automatic brake subsystem does not work due to a power source failure, for example, an operator operates the brake pedal, making it possible to supply the hydraulic fluid from the first accumulator to the brake. As a result, it is possible to brake the vehicle body in response to the operation of the operator.

MODE FOR CARRYING OUT THE INVENTION

Figure 1:
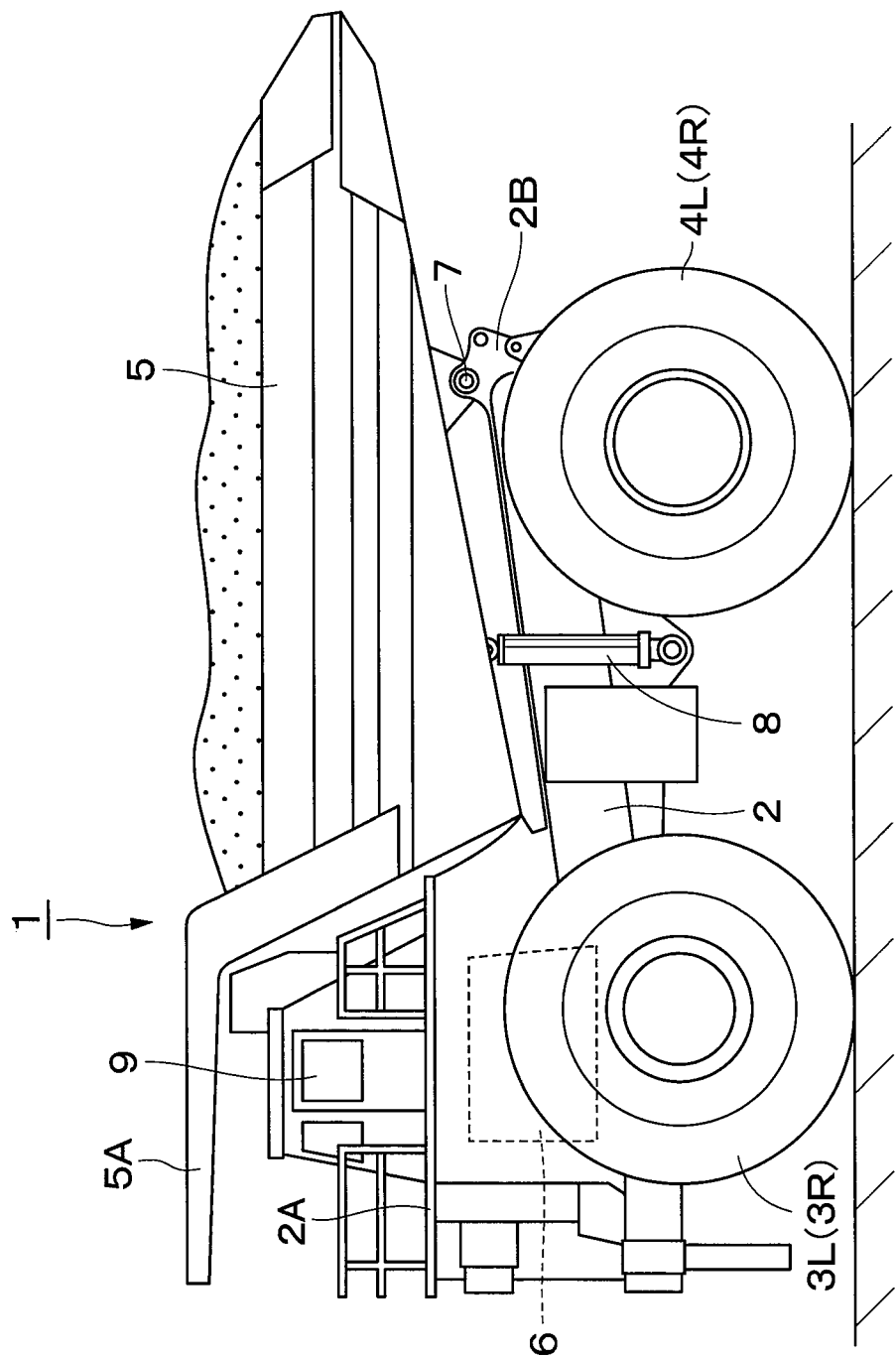
FIG. 1 is a front view showing a dump truck on which a brake system related to an embodiment in the present invention is mounted.

Hereinafter, a brake system according to the present invention will be in detail explained with reference to FIG. 1 to FIG. 10.

A dump truck 1 is a vehicle that carries transport objects such as crushed stones or sand and earth excavated in a mine or the like, for example. The dump truck 1 includes a vehicle body (main frame) 2 having a rigid frame structure, left and right front wheels 3L, 3R and left and right rear wheels 4L, 4R provided in a lower part of the vehicle body 2 and a vessel 5 that is provided in a rear part upper side of the vehicle body 2 and loads cargo of sand and earth or the like. A deck part 2A as a flat floor plate is provided in a front side of the vehicle body 2. An engine 6 is mounted in the lower side the deck part 2A.

The vessel 5 is attached in a bracket 2B provided in a rear part of the vehicle body 2 to be capable of tilting (lifting) thereon using a hinge pin 7. A hoist cylinder 8 extending in an upper-lower direction is provided between a front side portion in a lower part of the vessel 5 over the hinge pin 7 and the vehicle body 2. Accordingly, a front part side of the vessel 5 is tilted in the upper-lower direction with the hinge pin 7 as a fulcrum in response to an expanding or contracting operation of the hoist cylinder 8 to discharge the cargo. The front side of the vessel 5 is provided integrally with a protector 5A covering a cab 9 to be described later from above.

The cab 9 is provided in the front side of the vehicle body 2 to be positioned in the lower side of the protector 5A in the vessel 5. That is, the cab 9 is provided on the deck part 2A disposed in the front side of the vehicle body 2. The cab 9 forms an operator's room which an operator (driver) of the dump truck 1 gets in and out of. An operator's seat, an accelerator pedal, a hoist pedal, a steering handle and a steering handle drive motor (any of them is not shown), a brake pedal 23 to be described later, and the like are arranged in the cab 9.

In addition, a manned brake subsystem 11, an automatic brake subsystem 24, a controller 37 and a hoist valve (not shown) that controls an operation of the hoist cylinder 8, which will be described later, and the like are mounted on the dump truck 1. The controller 37 controls the steering handle drive motor, an engine rotational speed, the hoist valve, and the like, and controls steering, an acceleration force and a deceleration force of the dump truck 1, an expanding or contracting operation of the hoist cylinder 8, and the like.

Figure 2:
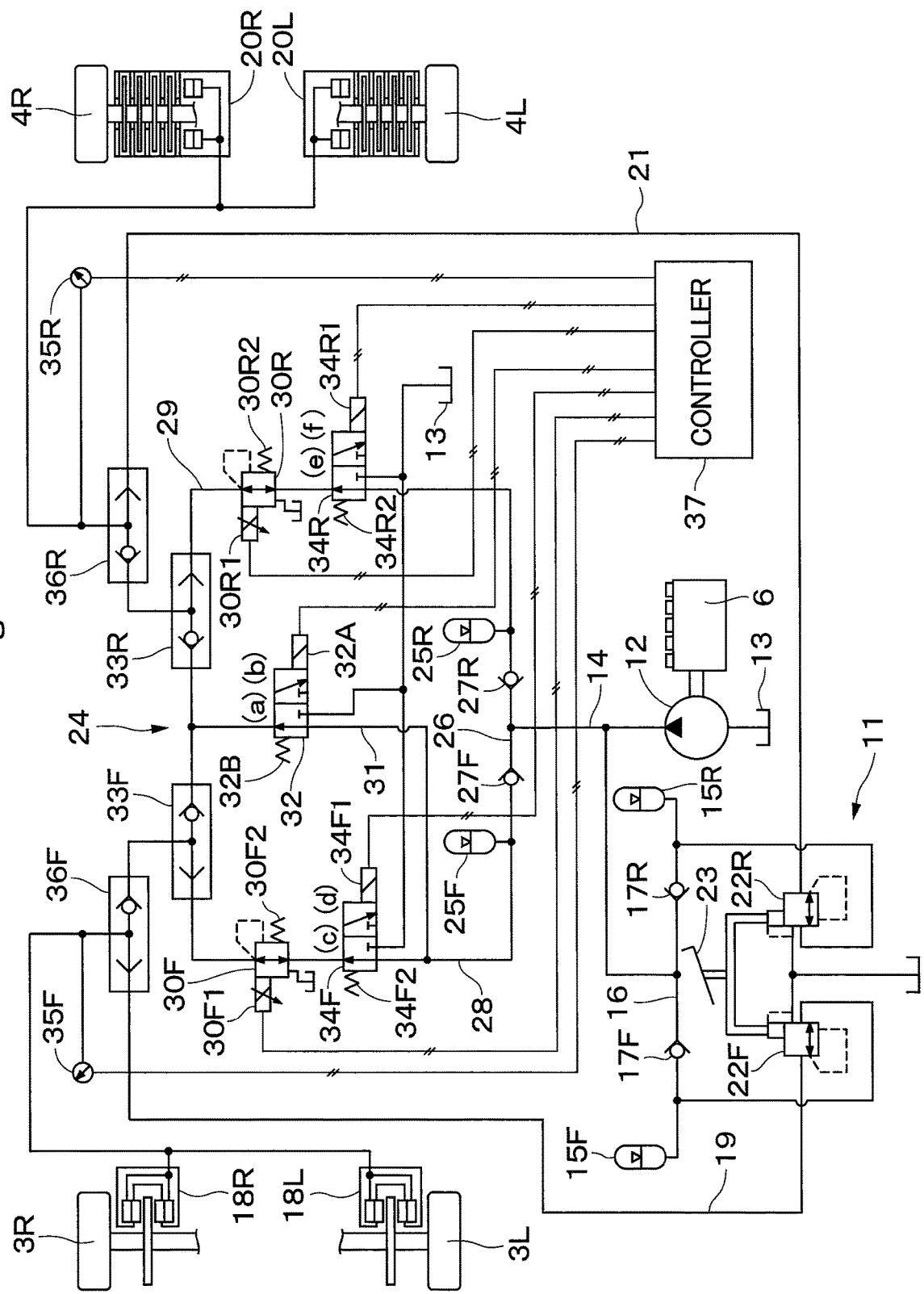
FIG. 2 is a control circuit diagram showing a brake system according to the embodiment.

Next, an explanation will be made of the brake system according to the present embodiment that is mounted on the dump truck 1 with reference to FIG. 2.

The brake system according to the present embodiment includes the manned brake subsystem 11, which will be described later, for a manned driving in which an operator drives the dump ruck 1, and the automatic brake subsystem 24, which will be described later, for an automatic driving in which the dump truck 1 is automatically driven with no operator getting in the dump truck 1.

The manned brake subsystem 11 is a brake system for performing braking to the vehicle body 2 of the dump truck 1 by a brake operation of an operator. The manned brake subsystem 11 includes a hydraulic pump 12, first accumulators 15F, 15R, front brakes 18L, 18R, rear brakes 20L, 20R, first brake valves 22F, 22R and a brake pedal 23, which will be described later, and the like.

The hydraulic pump 12 as a fluid pump configures a hydraulic source together with a tank 13. The tank 13 is connected to the suction side of the hydraulic pump 12, and a pump line 14 is connected to the delivery side of the hydraulic pump 12. The hydraulic pump 12 suctions fluid (hydraulic oil) reserved in the tank 13 by being driven by the engine 6 for pressurization. The pressurized fluid is delivered to the pump line 14 as a high-pressure hydraulic fluid to be supplied to the front brakes 18L, 18R and the rear brakes 20L, 20R.

The first accumulators 15F, 15R are connected in parallel to the pump line 14 through an accumulator line 16. The front first accumulator 15F accumulates therein the hydraulic fluid supplied to the front brakes 18L, 18R. The rear first accumulator 15R accumulates therein the hydraulic fluid supplied to the rear brakes 20L, 20R. The accumulator line 16 is provided with a check valve 17F and a check valve 17R. The check valve 17F allows a flow of the hydraulic fluid from the hydraulic pump 12 toward the first accumulator 15F and blocks a reverse flow of the hydraulic fluid. The check valve 17R allows a flow of the hydraulic fluid from the hydraulic pump 12 toward the first accumulator 15R and blocks a reverse flow of the hydraulic fluid.

The left front brake 18L is provided in the left front wheel 3L, and the right front brake 18R is provided in the right front wheel 3R. The left and right front brakes 18L, 18R each are configured of a disc brake, for example. The left and right front brakes 18L, 18R are connected to the first accumulator 15F by a front first line 19. The hydraulic fluid is supplied to the left and right front brakes 18L, 18R from the first accumulator 15F in response to a depression operation of the brake pedal 23. Consequently, the left and right front brakes 18L, 18R apply braking forces to the left and right front wheels 3L, 3R, respectively.

The left rear brake 20L is provided in the left rear wheel 4L and the right rear brake 20R is provided in the right rear wheel 4R. The left and right rear brakes 20L, 20R each are configured of a wet multiple disc brake, for example. The left and right rear brakes 20L, 20R are connected to the first accumulator 15R by a rear first line 21. The hydraulic fluid is supplied to the left and right rear brakes 20L, 20R from the first accumulator 15R in response to a depression operation of the brake pedal 23. Consequently, the left and right rear brakes 20L, 20R apply braking forces to the left and right rear wheels 4L, 4R, respectively.

A front first brake valve 22F is positioned between the first accumulator 15F and the left and right front brakes 18L, 18R and is provided in the halfway of the front first line 19. A rear first brake valve 22R is positioned between the first accumulator 15R and the left and right rear brakes 20L, 20R and is provided in the halfway of the rear first line 21. The first brake valves 22F, 22R each are configured of a pressure-reducing valve, for example.

The front first brake valve 22F controls a pressure of a hydraulic fluid to be supplied to each of the left and right front brakes 18L, 18R through the front first line 19 from the first accumulator 15F in response to a depression operation quantity of the brake pedal 23. The rear first brake valve 22R controls a pressure of a hydraulic fluid to be supplied to the left and right rear brakes 20L, 20R through the rear first line 21 from the first accumulator 15R in response to a depression operation quantity of the brake pedal 23.

The brake pedal 23 is provided in the cab 9 of the dump truck 1. The brake pedal 23 is operated to be depressed by an operator in a case of performing the braking to the dump truck 1 at the manned driving.

Figure 3:
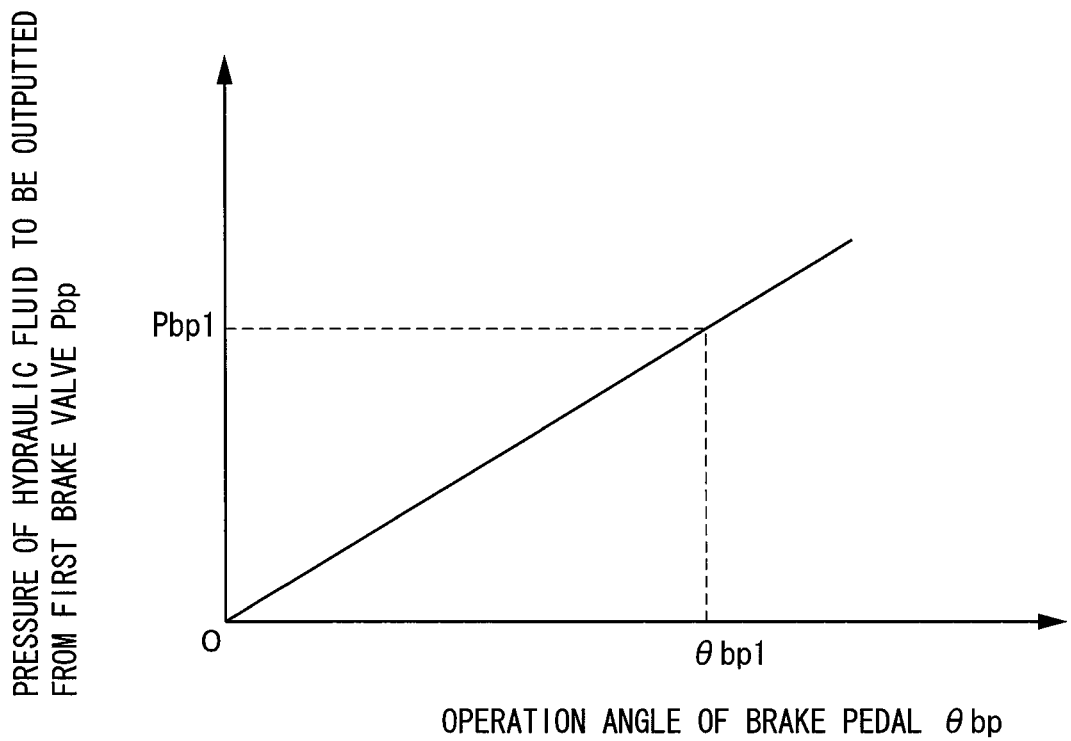
FIG. 3 is a characteristic line diagram showing a relation between an operation angle of a brake pedal and a pressure of a hydraulic fluid to be outputted from a first brake valve.

In this case, as shown in FIG. 3, a pressure Pbp of the hydraulic fluid that is outputted from each of the first brake valves 22F, 22R increases with an increase of a depression operation quantity (an operation angle) $\theta bp$ of the brake pedal 23, and when $\theta bp=\theta bp1$, $Pbp=Pbp1$. In this way, the pressure of the hydraulic fluid that is outputted from each of the first brake valves 22F, 22R changes with the depression operation quantity of the brake pedal 23, which is supplied to the front brakes 18L, 18R and the rear brakes 20L, 20R, respectively.

Figure 4:
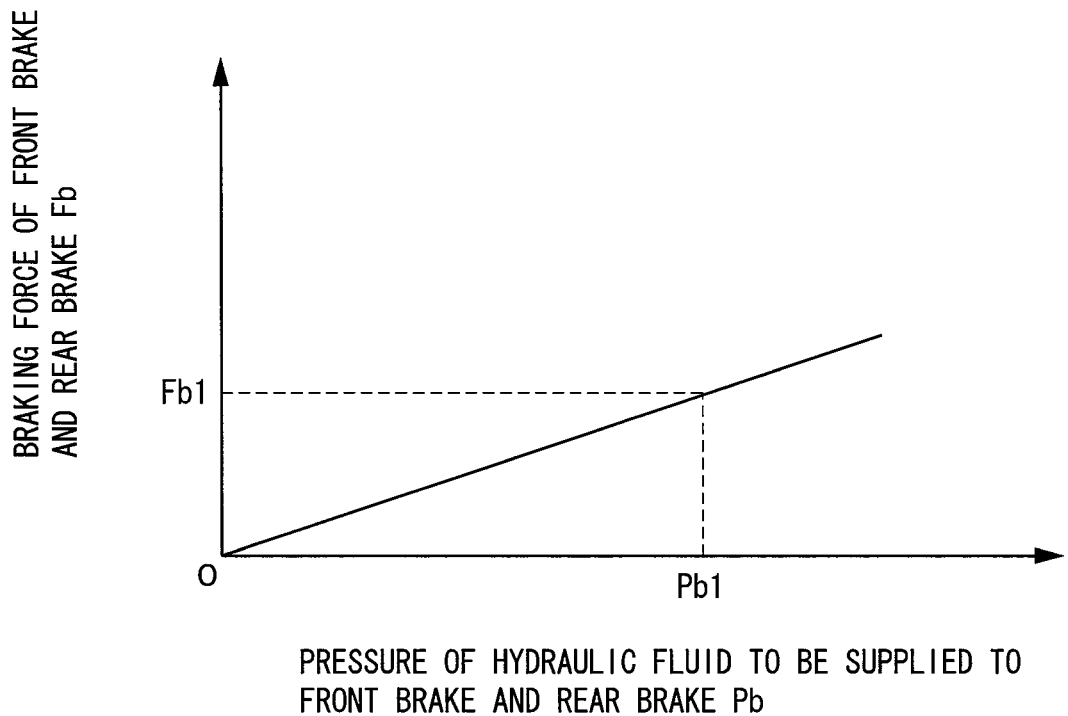
FIG. 4 is a characteristic line diagram showing a relation between a pressure of a hydraulic fluid to be supplied to a brake and a braking force of the brake.

Meanwhile, as shown in FIG. 4, a braking force Fb of each of the front brakes 18L, 18R and the rear brakes 20L, 20R increases with an increase of a pressure Pb of the hydraulic fluid to be supplied to each of the front brakes 18L, 18R and the rear brakes 20L, 20R, and when Pb=Pb1, Fb=Fb1.

Accordingly, in a case of performing the braking of the dump truck 1 by the manned brake subsystem 11, an operator controls the depression operation quantity (the operation angle) $\theta bp$ of the brake pedal 23, making it possible to control the braking force Fb in each of the front brakes 18L, 18R and the rear brakes 20L, 20R.

Next, the automatic brake subsystem 24 is a brake system for automatically performing the braking to the vehicle body 2 of the dump truck 1 not through an operator, that is, not relying upon an operation of an operator. The automatic brake subsystem 24 includes the hydraulic pump 12, the front brakes 18L, 18R, the rear brakes 20L, 20R, second accumulators 25F, 25R, second brake valves 30F, 30R, and a first solenoid switching valve 32, first shuttle valves 33F, 33R, second solenoid switching valves 34F, 34R, pressure sensors 35F, 35R and the controller 37, which will be described later.

The second accumulators 25F, 25R are connected in parallel to the pump line 14 through an accumulator line 26. The front second accumulator 25F accumulates therein the hydraulic fluid supplied to the front brakes 18L, 18R. The rear second accumulator 25R accumulates therein the hydraulic fluid supplied to the rear brakes 20L, 20R. Here, a check valve 27F and a check valve 27R are provided in the accumulator line 26. The check valve 27F allows a flow of the hydraulic fluid from the hydraulic pump 12 toward the second accumulator 25F and blocks a reverse flow of the hydraulic fluid. The check valve 27R allows a flow of the hydraulic fluid from the hydraulic pump 12 toward the second accumulator 25R and blocks a reverse flow of the hydraulic fluid.

The front second accumulator 25F is connected to the left and right front brakes 18L, 18R through a front second line 28. The front second line 28 joins the front first line 19 between the front brakes 18L, 18R and the first shuttle valve 33F to be described later. The rear second accumulator 25R is connected to the left and right rear brakes 20L, 20R through a rear second line 29. The rear second line 29 joins the rear first line 21 between the rear brakes 20L, 20R and the first shuttle valve 33R to be described later.

The front second brake valve 30F is positioned between the second accumulator 25F and the left and right front brakes 18L, 18R and is provided in the halfway of the front second line 28. The rear second brake valve 30R is positioned between the second accumulator 25R and the left and right rear brakes 20L, 20R and is provided in the halfway of the rear second line 29.

Here, the second brake valve 30F is configured by a solenoid proportional pressure-reducing valve of a normally open type having an solenoid pilot part 30F1 and a spring 30F2, for example. The second brake valve 30F automatically returns to a communication position with the second accumulator 25F by the spring 30F2 in an electricity disconnected state in which an operating signal is not supplied to the solenoid pilot part 30F1 from the controller 37. In addition, the second brake valve 30F changes in a valve opening in response to the operating signal (a current value of the signal) when an operating signal for valve opening (the operating signal less than a first command value Icbv2 to be described later) is supplied to the solenoid pilot part 30F1 from the controller 37. Thereby, the second brake valve 30F changes the pressure of the hydraulic fluid to be supplied to each of the front brakes 18L, 18R through the front second line 28 from the second accumulator 25F.

Further, the second brake valve 30F closes when an operating signal for valve closing (the operating signal equal to or more than the first command value Icbv2 to be described later) is supplied to the solenoid pilot part 30F1 from the controller 37. Thereby, the second brake valve 30F stops the supply of the hydraulic fluid to each of the front brakes 18L, 18R from the second accumulator 25F.

Similarly, the second brake valve 30R is configured by a solenoid proportional pressure-reducing valve of a normally open type having a solenoid pilot part 30R1 and a spring 30R2, for example. The second brake valve 30R automatically returns to a communication position with the second accumulator 25R by the spring 30R2 in an electricity disconnected state in which an operating signal is not supplied to the solenoid pilot part 30R1 from the controller 37. In addition, the second brake valve 30R changes in a valve opening in response to the operating signal (the current value of the signal) when an operating signal for valve opening (the operating signal less than the first command value Icbv2) is supplied to the solenoid pilot part 30R1 from the controller 37. Thereby, the second brake valve 30R changes the pressure of the hydraulic fluid to be supplied to each of the rear brakes 20L, 20R through the rear second line 29 from the second accumulator 25R. Further, the second brake valve 30R closes when an operating signal for valve closing (the operating signal equal to or more than the first command value Icbv2) is supplied to the solenoid pilot part 30R1 from the controller 37.

Thereby, the second brake valve 30R stops the supply of the hydraulic fluid to each of the rear brakes 20L, 20R from the second accumulator 25R.

Figure 5:
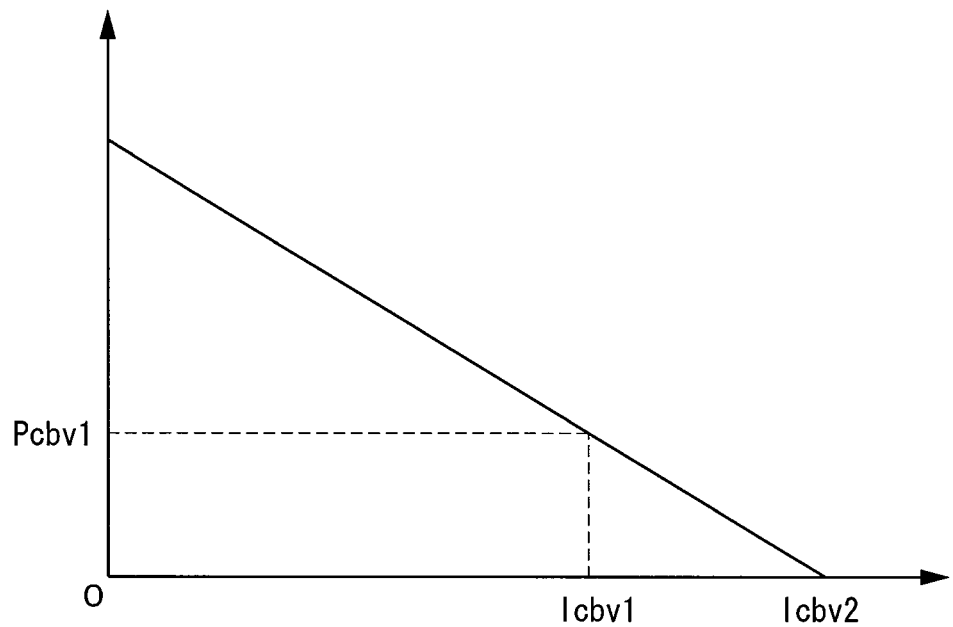
FIG. 5 is a characteristic line diagram showing a relation between an operating signal to be supplied to a second brake valve from a controller and a pressure of a hydraulic fluid to be outputted from the second brake valve.

In this case, as shown in FIG. 5, a pressure Pcbv of the hydraulic fluid that is outputted from each of the second brake valves 30F, 30R increases with a decrease of an operating signal Icbv to be supplied to each of the second brake valves 30F, 30R, from the controller 37 and when Icbv=Icbv1, Pcbv=Pcbv1. Here, whether or not to perform the braking using the second brake valves 30F, 30R is determined based upon whether the operating signal Icbv is equal to or more than the predetermined first command value (a threshold value) Icbv2 or less than the first command value Icbv2. Accordingly, when the operating signal Icbv is equal to or more than the first command value Icbv2, the pressure Pcbv of the hydraulic fluid to be outputted from each of the second brake valves 30F, 30R becomes zero (Pcbv=0). In this way, the pressure of the hydraulic fluid to be outputted from each of the second brake valves 30F, 30R changes in response to the operating signal to be supplied from the controller 37, which is supplied to the front brakes 18L, 18R and the rear brakes 20L, 20R.

One end of a branch line 31 is positioned between the second accumulator 25F and the second brake valve 30F and is connected to the halfway of the front second line 28. The other end of the branch line 31 is connected to the input side of each of the first shuttle valves 33F, 33R to be described later.

A first solenoid switching valve 32 is provided in the halfway of the branch line 31, and is connected to the second accumulator 25F to be in parallel with the second brake valve 30F. The first solenoid switching valve 32 configures a backup circuit in a case where the second brake valves 30F, 30R are in failure, for example. That is, the first solenoid switching valve 32 controls supply and discharge of the hydraulic fluid between the front brakes 18L, 18R and the rear brakes 20L, 20R, and the second accumulator 25F in a case where the second brake valves 30F, 30R are in failure.

The first solenoid switching valve 32 is configured by a solenoid valve of a normally open type having a three-port and a two-position, composed of a solenoid pilot part 32A and a spring 32B, for example. The first solenoid switching valve 32 automatically returns to a communication position (a) with the second accumulator 25F by the spring 32B in an electricity disconnected state in which an operating signal is not supplied to the solenoid pilot part 32A from the controller 37. Thereby, the first solenoid switching valve 32 supplies the hydraulic fluid from the second accumulator 25F through the branch line 31 to the front brakes 18L, 18R and the rear brakes 20L, 20R. On the other hand, the first solenoid switching valve 32 is switched to a disconnection position (b) to the second accumulator 25F when the operating signal is supplied to the solenoid pilot part 32A from the controller 37. Thereby, the first solenoid switching valve 32 connects the front brakes 18L, 18R and the rear brakes 20L, 20R to the tank 13.

Figure 6:
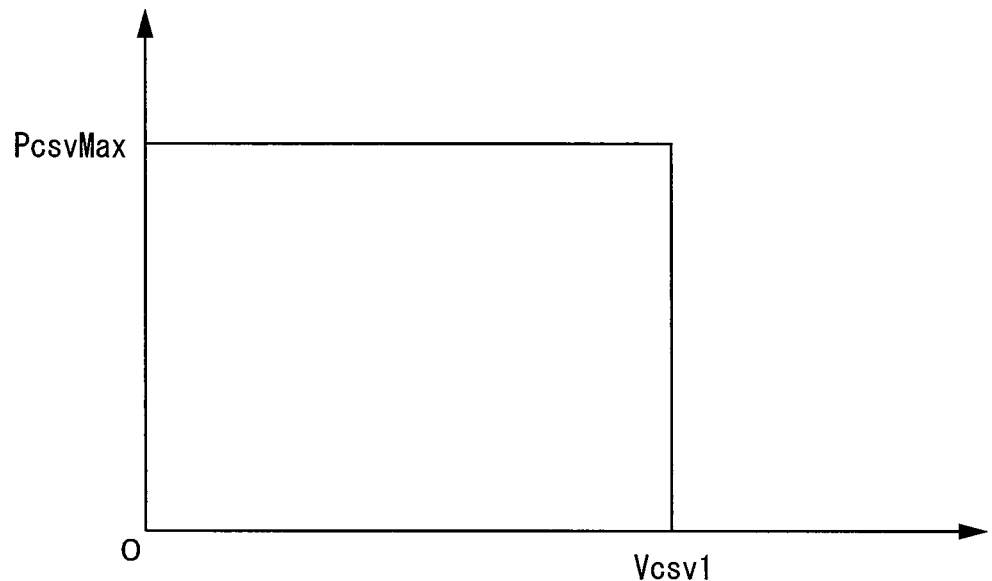
FIG. 6 is a characteristic line diagram showing a relation between an operating signal to be supplied to a first solenoid switching valve from the controller and a pressure of a hydraulic fluid to be outputted from the first solenoid switching valve.

In this case, as shown in FIG. 6, a pressure Pcsv of the hydraulic fluid that is outputted from the first solenoid switching valve 32 changes in response to an operating signal Vcsv to be supplied to the first solenoid switching valve 32 from the controller 37. Here, whether or not to switch the first solenoid switching valve 32 to the disconnection position (b) is determined based upon whether the operating signal Vcsv is equal to or more than a predetermined second command value (a threshold value) Vcsv1 or less than the second command value Vcsv1. For example, when the operating signal Vcsv is less than the second command value Vcsv1, the first solenoid switching valve 32 becomes in the communication position (a), and the pressure Pcsv of the hydraulic fluid becomes the maximum value PcsvMax. Meanwhile, when the operating signal Vcsv is equal to or more than the second command value Vcsv1, the first solenoid switching valve 32 becomes in the disconnection position (b), and the pressure Pcsv of the hydraulic fluid is zero (Pcsv=0). In this way, the pressure of the hydraulic fluid to be outputted from the first solenoid switching valve 32 changes in response to the operating signal to be supplied from the controller 37, which is supplied to the front brakes 18L, 18R and the rear brakes 20L, 20R.

The front first shuttle valve 33F as a control brake pressure selective valve is provided between the front brakes 18L, 18R, and the second brake valve 30F and the first solenoid switching valve 32. The second brake valve 30F and the first solenoid switching valve 32 are connected to the input side of the first shuttle valve 33F. The front first line 19 is connected through a second shuttle valve 36F to be described later to the output side of the first shuttle valve 33F. The first shuttle valve 33F selects a high-pressure side hydraulic fluid out of the hydraulic fluid supplied through the second brake valve 30F and the hydraulic fluid supplied through the first solenoid switching valve 32 to be supplied through the front first line 19 to the front brakes 18L, 18R.

Similarly, the rear first shuttle valve 33R as the control brake pressure selective valve is provided between the rear brakes 20L, 20R, and the second brake valve 30R and the first solenoid switching valve 32. The second brake valve 30R and the first solenoid switching valve 32 are connected to the input side of the first shuttle valve 33R. The rear first line 21 is connected through a second shuttle valve 36R to be described later to the output side of the first shuttle valve 33R. The first shuttle valve 33R selects a high-pressure side hydraulic fluid out of the hydraulic fluid supplied through the second brake valve 30R and the hydraulic fluid supplied through the first solenoid switching valve 32 to be supplied through the rear first line 21 to the rear brakes 20L, 20R.

Accordingly, in a case where the hydraulic fluid is outputted simultaneously from the second brake valves 30F, 30R and the first solenoid switching valve 32, the high-pressure side hydraulic fluid is selected out of the hydraulic fluid from the second brake valves 30F, 30R and the hydraulic fluid from the first solenoid switching valve 32 by the first shuttle valves 33F, 33R. Thereby, the front brakes 18L, 18R and the rear brakes 20L, 20R generate the braking force in accordance with the high-pressure side hydraulic fluid out of the hydraulic fluid from the second brake valves 30F, 30R and the hydraulic fluid from the first solenoid switching valve 32.

The front second solenoid switching valve 34F is positioned between the second accumulator 25F and the second brake valve 30F and is provided in the halfway of the front second line 28. The second solenoid switching valve 34F is located downstream of the connection part of the front second line 28 with the branch line 31 in the flow direction of the hydraulic fluid. The second solenoid switching valve 34F connects the second brake valve 30F to any one of the second accumulator 25F and the tank 13. Here, the second solenoid switching valve 34F is configured by a solenoid valve of a normally open type having a three-port and a two-position, composed of a solenoid pilot part 34F1 and a spring 34F2, for example. The second solenoid switching valve 34F automatically returns to a communication position (c) by the spring 34F2 in an electricity disconnected state in which an operating signal is not supplied to the solenoid pilot part 34F1 from the controller 37. Thereby, the second solenoid switching valve 34F connects the second brake valve 30F to the second accumulator 25F. On the other hand, the second solenoid switching valve 34F is switched to a disconnection position (d) to the second accumulator 25F when the operating signal is supplied to the solenoid pilot part 34F1 from the controller 37. Thereby, the second solenoid switching valve 34F disconnects the second accumulator 25F and the second brake valve 30F, and connects the second brake valve 30F to the tank 13.

The rear second solenoid switching valve 34R is positioned between the second accumulator 25R and the second brake valve 30R and is provided in the halfway of the rear second line 29. The second solenoid switching valve 34R connects the second brake valve 30R to any one of the second accumulator 25R and the tank 13. Here, the second solenoid switching valve 34R is configured by a solenoid control valve of a normally open type having a three-port and a two-position, composed of a solenoid pilot part 34R1 and a spring 34R2, for example. The second solenoid switching valve 34R automatically returns to a communication position (e) by the spring 34R2 in an electricity disconnected state in which an operating signal is not supplied to the solenoid pilot part 34R1 from the controller 37. Thereby, the second solenoid switching valve 34R connects the second brake valve 30R to the second accumulator 25R. On the other hand, the second solenoid switching valve 34R is switched to a disconnection position (f) when the operating signal is supplied to the solenoid pilot part 34R1 from the controller 37. Thereby, the second solenoid switching valve 34R disconnects the second accumulator 25R and the second brake valve 30R, and connects the second brake valve 30R to the tank 13.

Figure 7:
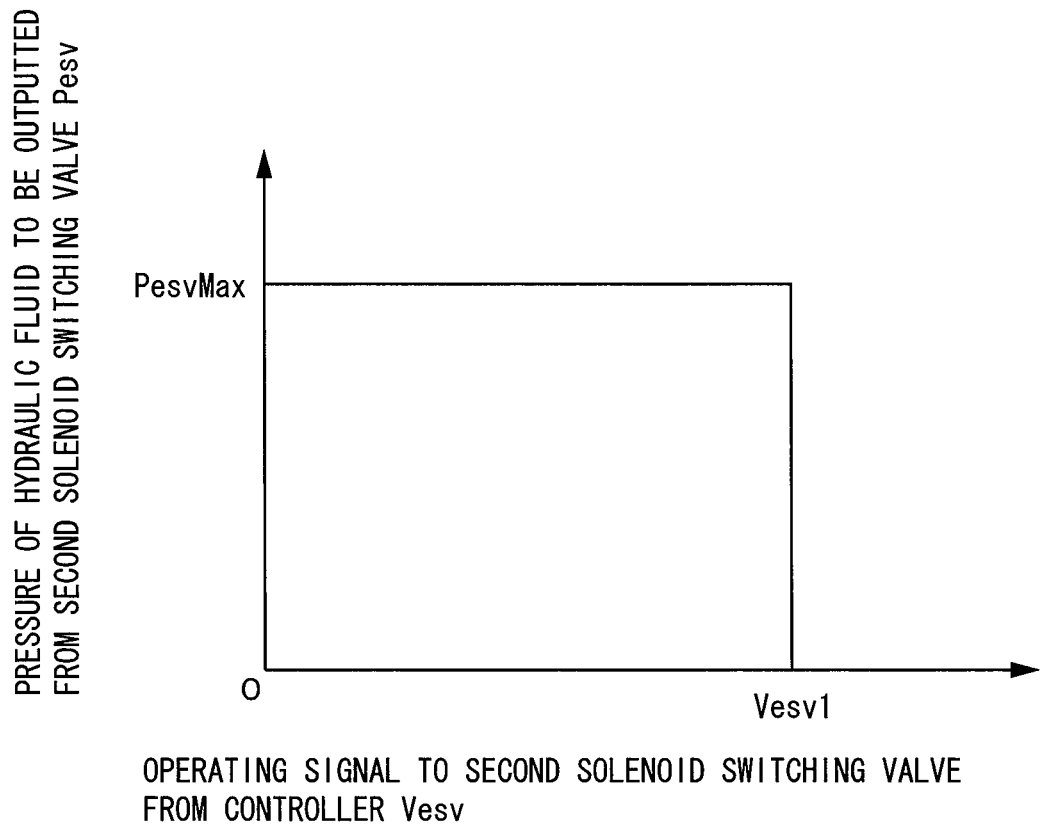
FIG. 7 is a characteristic line diagram showing a relation between an operating signal to be supplied to a second solenoid switching valve from the controller and a pressure of a hydraulic fluid to be outputted from the second solenoid switching valve.

In this case, as shown in FIG. 7, a pressure Pesv of the hydraulic fluid that is outputted from each of the second solenoid switching valves 34F, 34R changes in response to an operating signal Vesv to be supplied to each of the second solenoid switching valves 34F, 34R from the controller 37. Here, whether or not to switch the second solenoid switching valves 34F, 34R to the disconnection positions (d), (f) is determined based upon whether the operating signal Vesv is equal to or more than a predetermined third command value (a threshold value) Vesv1 or less than the third command value Vesv1. For example, when the operating signal Vesv is less than the third command value Vesv1, the second solenoid switching valves 34F, 34R become in the communication positions (c), (e) and the pressure Pesv of the hydraulic fluid becomes the maximum value PesvMax. Meanwhile, when the operating signal Vesv is equal to or more than the third command value Vesv1, the second solenoid switching valves 34F, 34R become in the disconnection positions (d), (f), and the pressure Pesv of the hydraulic fluid is zero (Pesv=0). In this way, the pressure of the hydraulic fluid to be outputted from each of the second solenoid switching valves 34F, 34R changes in response to the operating signal to be supplied from the controller 37, which is supplied to the second brake valves 30F, 30R.

The front pressure sensor 35F as a pressure detector is positioned between the front brakes 18L, 18R and the first shuttle valve 33F and is provided in the halfway of the front second line 28. The pressure sensor 35F detects a pressure of the hydraulic fluid supplied to each of the front brakes 18L, 18R and supplies a detection signal in accordance with the detected pressure to the controller 37.

The rear pressure sensor 35R as a pressure detector is positioned between the rear brakes 20L, 20R and the first shuttle valve 33R and is provided in the halfway of the rear second line 29. The pressure sensor 35R detects a pressure of the hydraulic fluid supplied to each of the rear brakes 20L, 20R and supplies a detection signal in accordance with the detected pressure to the controller 37.

The front second shuttle valve 36F is provided between the front brakes 18L, 18R, and the first brake valve 22F and the first shuttle valve 33F. The second shuttle valve 36F has an input side to which the first brake valve 22F and the first shuttle valve 33F are connected and an output side to which the front brakes 18L, 18R are connected. The second shuttle valve 36F selects a high-pressure side hydraulic fluid out of the hydraulic fluid supplied through the first brake valve 22F and the hydraulic fluid supplied through the second brake valve 30F or the first solenoid switching valve 32 to be supplied to the front brakes 18L, 18R.

The rear second shuttle valve 36R is provided between the rear brakes 20L, 20R, the first brake valve 22R and the first shuttle valve 33R. The second shuttle valve 36R has an input side to which the first brake valve 22R and the first shuttle valve 33R are connected and an output side to which the rear brakes 20L, 20R are connected. The second shuttle valve 36R selects a high-pressure side hydraulic fluid out of the hydraulic fluid supplied through the first brake valve 22R and the hydraulic fluid supplied through the second brake valve 30R or the first solenoid switching valve 32 to be supplied to the rear brakes 20L, 20R.

The controller 37 is a control device configured of a microcomputer, for example. The controller 37 is mounted on the vehicle body 2 of the dump truck 1. The controller 37 has an input side to which the pressure sensors 35F, 35R, and the like are connected. The controller 37 has an output side to which the solenoid pilot parts 30F1, 30R1 of the second brake valves 30F, 30R, the solenoid pilot part 32A of the first solenoid switching valve 32, the solenoid pilot parts 34F1, 34R1 of the second solenoid switching valves 34F, 34R, and the like are connected. The controller 37 determines operating states of the second brake valves 30F, 30R based upon operating signals to the second brake valves 30F, 30R, an operating signal to the first solenoid switching valve 32 and detection signals from the pressure sensors 35F, 35R. The controller 37 controls operations of the first solenoid switching valve 32 and the second solenoid switching valves 34F, 34R in response to whether or not the second brake valves 30F, 30R are normally operating.

The brake system of the dump truck 1 according to the present embodiment has the configuration as described above, and hereinafter, an explanation will be made of an operation of the dump truck 1. First, an explanation will be made of the manned driving of the dump truck 1 to be operated by an operator. In a case of the manned driving, the dump truck 1 having started a parking area travels on a preset path in a mine at a predetermined speed by operating the accelerator pedal, the steering handle, the brake pedal 23, and the like by an operator, and moves to the loading area. Cargo such as crushed objects and sand and earth excavated by an excavating machine of a hydraulic excavator or the like is loaded on the vessel 5 of the dump truck 1 having moved to the loading area.

The dump truck 1 in which the cargo is loaded on the vessel 5 moves to a soil dropping area by operating the accelerator pedal, the steering handle, the brake pedal 23 and the like by an operator. In the soil dropping area, the operator operates the hoist pedal to expand the hoist cylinder 8 and tilt the vessel 5, making it possible to discharge the cargo. In this way, at the manned driving, the operator operates the accelerator pedal, the steering handle, the brake pedal 23, the hoist pedal, and the like, so that the dump truck 1 reciprocates between the loading area and the soil dropping area to repeat a loading work of the cargo to the vessel 5 and a discharging work of the cargo from the vessel 5.

In a case of braking the dump truck 1 by the manned brake subsystem 11 at the manned driving, an operator performs a depression operation of the brake pedal 23. As shown in FIG. 3, a pressure Pbp of the hydraulic fluid to be outputted from each of the first brake valves 22F, 22R increases in response to an increase in a depression operation quantity (an operation angle) θbp of the brake pedal 23. In addition, as shown in FIG. 4, a braking force Fb of each of the front brakes 18L, 18R and the rear brakes 20L, 20R increases with an increase of the pressure Pb of the hydraulic fluid to be supplied to each of the front brakes 18L, 18R and the rear brakes 20L, 20R.

In this way, in a case of braking the dump truck 1 by the manned brake subsystem 11, the pressure of the hydraulic fluid to be outputted from each of the first brake valves 22F, 22R is controlled in response to the depression operation quantity of the brake pedal 23. This hydraulic fluid is supplied to the front brakes 18L, 18R and the rear brakes 20L, 20R, respectively. As a result, the front brakes 18L, 18R and the rear brakes 20L, 20R each can generate a braking force in accordance with the depression operation quantity of the brake pedal 23.

Next, an explanation will be made of the automatic driving of automatically driving the dump truck 1, not through an operator. In a case of the automatic driving, the dump truck 1 automatically travels on the preset path in a mine based upon map information of the mine, position measurement by GPS, self-position estimation by an in-vehicle sensor, an operating signal from a mission control office, and the like, and reciprocates between the loading area and the soil dropping area. The dump truck 1 having moved to the soil dropping area expands the hoist cylinder 8 by controlling the hoist valve to tilt the vessel 5, making it possible to automatically discharge the cargo in the vessel 5. In this way, the dump truck 1 at the automatic driving reciprocates with the automatic travel between the loading area and the soil dropping area to repeat a loading work of the cargo to the vessel 5 and a discharging work of the cargo from the vessel 5.

In a case of braking the dump truck 1 using the automatic brake subsystem 24 at the automatic driving, the controller 37 supplies an operating signal to each of the second brake valves 30F, 30R. Thereby, as shown in FIG. 5, a pressure Pcbv of the hydraulic fluid to be outputted from each of the second brake valves 30F, 30R changes in response to an operating signal Icbv to be supplied from the controller 37. Accordingly, the front brakes 18L, 18R and the rear brakes 20L, 20R each can generate a braking force in accordance with the pressure Pcbv to be outputted from each of the second brake valves 30F, 30R.

Here, in a case where the dump truck 1 is not braked at the automatic driving, an operating signal for valve closing is supplied to each of the second brake valves 30F, 30R from the controller 37. This operating signal for valve closing becomes the first command value (Icbv2 in FIG. 5) or more. At this time, in a case where the second brake valves 30F, 30R are normal, the pressure Pb of the hydraulic fluid to be detected by each of the pressure sensors 35F, 35R becomes less than a brake operating pressure Pbth from time t0 to time t2 to keep the tank pressure as a characteristic line 38 shown in a solid line in FIG. 8. That is, when the second brake valves 30F, 30R are normal, the pressure Pb of the hydraulic fluid keeps the tank pressure and the braking of the dump truck 1 is not performed. It should be noted that the brake operating pressure Pbth is a pressure when the front brakes 18L, 18R and the rear brakes 20L, 20R operate.

Figure 8:
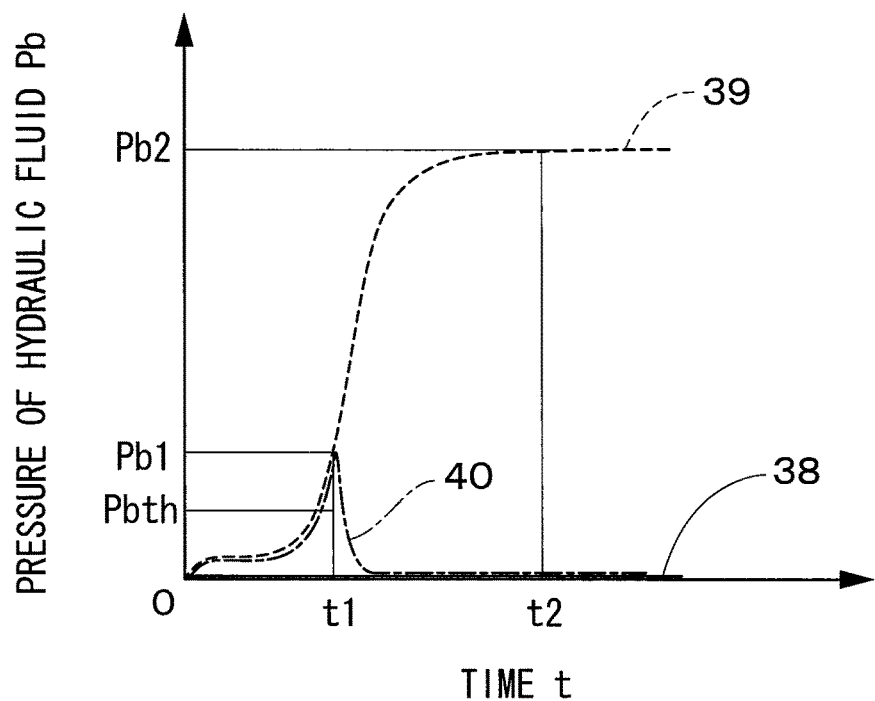
FIG. 8 is a characteristic line diagram showing a change in a pressure of a hydraulic fluid at the non-braking by an automatic brake subsystem over time at the normal time and the abnormal time of the second brake valve, and at the controlling time by the controller, respectively.

On the other hand, in a case where the second brake valves 30F, 30R are abnormal due to any reason, for example, as a characteristic line 39 shown in a broken line in FIG. 8, the pressure Pb of the hydraulic fluid rises to Pb1 equal to or more than the brake operating pressure Pbth at time t1, and further, rises to Pb2 at time t2. That is, regardless of the supply of the operating signal for valve closing to each of the second brake valves 30F, 30R from the controller 37, when the pressure Pb of the hydraulic fluid becomes equal to or more than the brake operating pressure Pbth, it is estimated that the second brake valves 30F, 30R are performing abnormal operations. Therefore, the braking of the dump truck 1 that is not intended by the controller 37 is possibly performed.

In contrast, in the present embodiment, as a characteristic line 40 shown in a dashed line in FIG. 8, in a case where the pressure Pb of the hydraulic fluid is equal to or more than the brake operating pressure Pbth at time t1, the controller 37 sets the operating signal to be supplied to each of the second solenoid switching valves 34F, 34R to the maximum value equal to or more than a third command value (Vesv1 in FIG. 7). Thereby, the second solenoid switching valves 34F, 34R are changed to the disconnection positions (d), (f). Accordingly, the supply of the hydraulic fluid from the second accumulators 25F, 25R to the second brake valves 30F, 30R is disconnected. Therefore, the pressure Pb of the hydraulic fluid can be reduced to a tank pressure lower than the brake operating pressure Pbth from time t1 to time t2. Meanwhile, the controller 37 sets the operating signal to the first solenoid switching valve 32 to equal to or more than a second command value (Vcsv1 in FIG. 6). Thereby, the first solenoid switching valve 32 is switched to the disconnection position (b), and the supply of the hydraulic fluid to the front brakes 18L, 18R and the rear brakes 20L, 20R is disconnected. As a result, the unintended braking of the dump truck 1 can be suppressed to enhance reliability of the automatic brake subsystem 24.

Next, in a case where the dump truck 1 is braked at the automatic driving, an operating signal for valve opening is supplied to each of the second brake valves 30F, 30R from the controller 37. This operating signal for valve opening becomes less than the first command value (Icbv2 in FIG. 5). At this time, in a case where the second brake valves 30F, 30R are normal, the pressure Pb of the hydraulic fluid to be detected by each of the pressure sensors 35F, 35R rises, as a characteristic line 41 shown in a solid line in FIG. 9, to Pb1 equal to or more than the brake operating pressure Pbth at time t1, and further, rises to Pb2 at time t2. That is, when the second brake valves 30F, 30R are normal, the braking of the dump truck 1 is performed in response to the operating signal to be supplied to each of the second brake valves 30F, 30R from the controller 37.

On the other hand, in a case where the second brake valves 30F, 30R are abnormal due to any reason, the hydraulic fluid flows out into the tank 13 from each of the second brake valves 30F, 30R, for example. In this case, as a characteristic line 42 shown in a broken line in FIG. 9, the pressure Pb of the hydraulic fluid to be detected by each of the pressure sensors 35F, 35R becomes less than the brake operating pressure Pbth from time t0 to time t3 to keep the tank pressure. That is, regardless of the supply of the operating signal for valve opening to each of the second brake valves 30F, 30R from the controller 37, when the pressure Pb of the hydraulic fluid becomes less than the brake operating pressure Pbth, it is estimated that the second brake valves 30F, 30R are performing abnormal operations. Thereby, the braking of the dump truck 1 that is intended by the controller 37 is possibly not performed.

Figure 9:
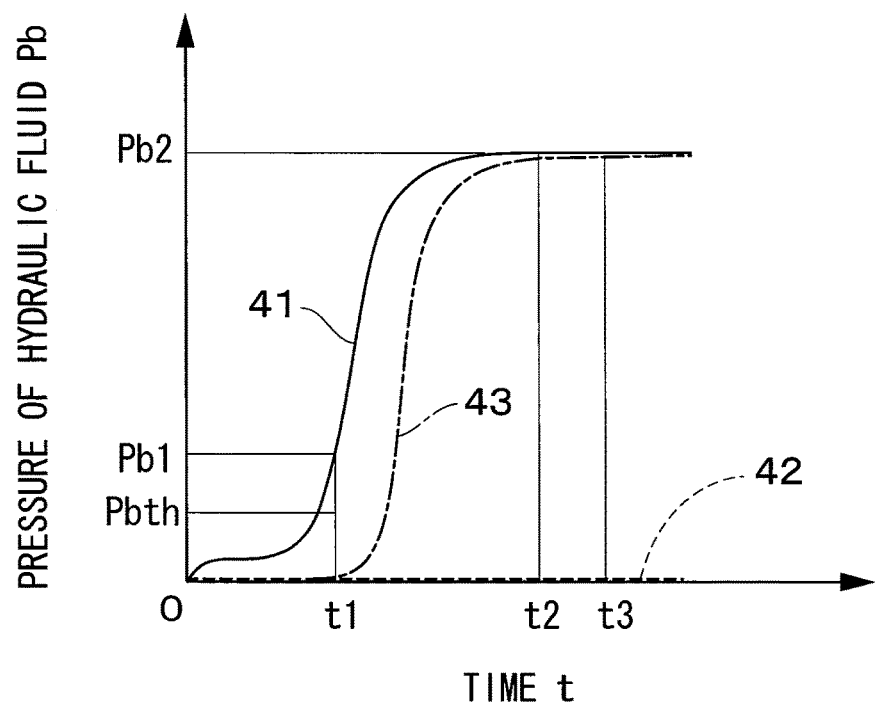
FIG. 9 is a characteristic line diagram showing a change in a pressure of a hydraulic fluid at the braking by the automatic brake subsystem over time at the normal time and the abnormal time of the second brake valve, and at the controlling time by the controller, respectively.

In contrast, in the present embodiment, as a characteristic line 43 shown in a dashed line in FIG. 9, in a case where the pressure Pb of the hydraulic fluid is less than the brake operating pressure Pbth at time t1, the controller 37 sets the operating signal to be supplied to the second solenoid switching valves 34F, 34R to the maximum value equal to or more than the third command value (Vesv1 in FIG. 7). Thereby, the second solenoid switching valves 34F, 34R are switched to the disconnection positions (d), (f). Accordingly, the supply of the hydraulic fluid from the second accumulators 25F, 25R to the second brake valves 30F, 30R is disconnected.

Meanwhile, the controller 37 sets the operating signal to the first solenoid switching valve 32 to the minimum value less than the second command value (Vcsv1 in FIG. 6). As a result, the first solenoid switching valve 32 is switched to the communication position (a), and the hydraulic fluid is supplied to the front brakes 18L, 18R and the rear brakes 20L, 20R through the first solenoid switching valve 32. As a result, the pressure Pb of the hydraulic fluid rises up from time t1 and increases to Pb2 at time t3.

That is, in a case where the second brake valves 30F, 30R do not operate normally, the controller 37 switches the second solenoid switching valves 34F, 34R to the disconnection positions (d), (f) to disconnect the supply of the hydraulic fluid to the second brake valves 30F, 30R. In addition, the controller 37 switches the first solenoid switching valve 32 to the communication position (a) to supply the hydraulic fluid to the front brakes 18L, 18R and the rear brakes 20L, 20R. As a result, the outflow of the hydraulic fluid into the tank 13 from the second brake valves 30F, 30R can be suppressed to brake the dump truck 1. Accordingly, since the pressure of the hydraulic fluid accumulated in each of the second accumulators 25F, 25R can be appropriately kept to brake the dump truck 1, it is possible to enhance the reliability of the automatic brake subsystem 24.

In this way, according to the present embodiment, in a state where the operating signal for valve closing is supplied to each of the second brake valves 30F, 30R from the controller 37, when the pressure Pb of the hydraulic fluid becomes equal to or more than the brake operating pressure Pbth, the controller 37 determines that the operations of the second brake valves 30F, 30R are abnormal. Then, the controller 37 switches the second solenoid switching valves 34F, 34R to the disconnection positions (d), (f). In addition, the controller 37 supplies the operating signal equal to or more than the second command value (Vcsv1 in FIG. 6) to the first solenoid switching valve 32, and switches the first solenoid switching valve 32 to the disconnection position (b). As a result, it is possible to disconnect the supply of the hydraulic fluid to the second brake valves 30F, 30R from the second accumulators 25F, 25R. Accordingly, the pressure Pb of the hydraulic fluid can be made lower than the brake operating pressure Pbth to suppress the unintended braking of the dump truck 1.

In addition, in a state where the operating signal for valve opening is supplied to each of the second brake valves 30F, 30R from the controller 37, when the pressure Pb of the hydraulic fluid becomes less than the brake operating pressure Pbth, the controller 37 determines that the operations of the second brake valves 30F, 30R are abnormal. Then, the controller 37 switches the second solenoid switching valves 34F, 34R to the disconnection positions (d), (f). In addition, the controller 37 supplies the operating signal less than the second command value (Vcsv1 in FIG. 6) to the first solenoid switching valve 32, and switches the first solenoid switching valve 32 to the communication position (a). As a result, it is possible to disconnect the supply of the hydraulic fluid to the second brake valves 30F, 30R from the second accumulators 25F, 25R, and the outflow of the hydraulic fluid into the tank 13 from the second brake valves 30F, 30R can be suppressed. Meanwhile, the hydraulic fluid can be supplied to the front brakes 18L, 18R and the rear brakes 20L, 20R through the first solenoid switching valve 32 from the second accumulator 25F to perform the intended braking of the dump truck 1.

Next, in a case where power source failure, power source malfunction and the like occur at the automatic driving of the dump truck 1, the braking of the dump truck 1 by the aforementioned automatic brake subsystem 24 cannot be performed. However, in the automatic brake subsystem 24 according to the present embodiment, in the electricity disconnected state where the operating signal is not supplied from the controller 37, the second brake valves 30F, 30R automatically return the communication position by the springs 30F2, 30R2. In addition, the first solenoid switching valve 32 automatically returns the communication position (a) by the spring 32B, and the second solenoid switching valves 34F, 34R automatically return the communication positions (c), (e) by the springs 34F2, 34R2.

Accordingly, even when the braking by the automatic brake subsystem 24 cannot be performed due to the power source failure, the power source malfunction and the like, the hydraulic fluid from each of the second accumulators 25F, 25R is automatically supplied to the front brakes 18L, 18R and the rear brakes 20L, 20R, respectively. As a result, the braking of the dump truck 1 can be performed to enhance the reliability of the automatic brake subsystem 24.

Figure 10:
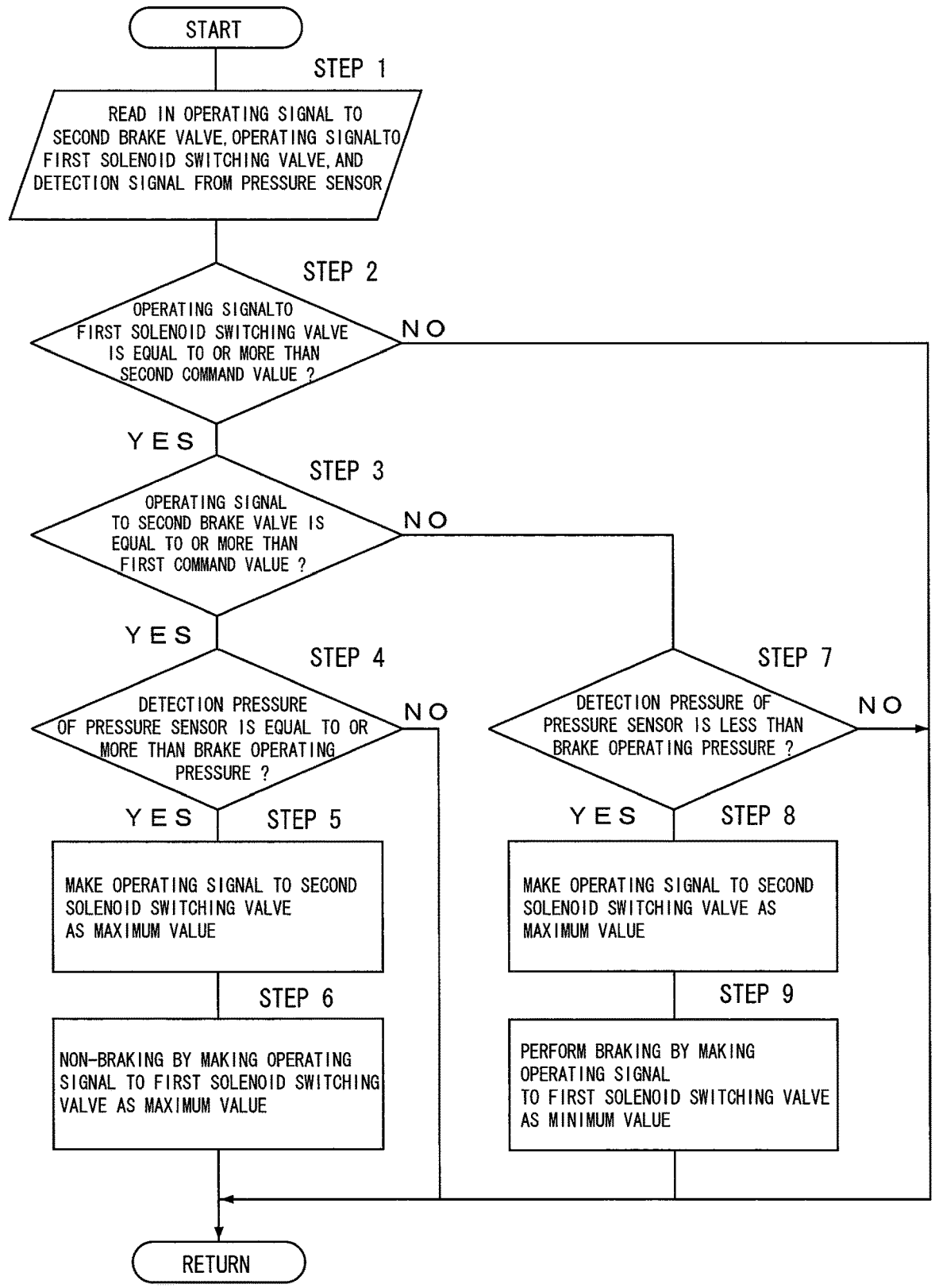
FIG. 10 is a flow chart showing control processing to be executed by the controller at the operating of the automatic brake subsystem.

Next, an explanation will be made of the control processing to be executed by the controller 37 at the operating of the automatic brake subsystem 24 with reference to FIG. 10.

This control processing starts at a point where the dump truck 1 starts the automatic driving, for example. At step 1, operating signals to be supplied to the second brake valves 30F, 30R, an operating signal to be supplied to the first solenoid switching valve 32 and detection signals to be supplied from the pressure sensors 35F, 35R are read in, and the process goes to step 2.

At step 2, it is determined whether or not the operating signal supplied to the first solenoid switching valve 32 is equal to or more than the predetermined second command value (Vcsv1 in FIG. 6). In a case where "NO" is determined at step 2, the hydraulic fluid from each of the second accumulators 25F, 25R is supplied solenoid switching valve to the front brakes 18L, 18R and the rear brakes 20L, 20R through the first solenoid switching valve 32. Thereby, the braking of the dump truck 1 is performed.

Meanwhile, in a case where "YES" is determined at step 2, since the operating signal supplied to the first solenoid switching valve 32 is equal to or more than the second command value, it is determined that the braking by the first solenoid switching valve 32 is not performed, and the process goes to step 3. At step 3, it is determined whether or not the operating signal supplied to each of the second brake valves 30F, 30R is equal to or more than the predetermined first command value (Icbv2 in FIG. 5).

In a case where "YES" is determined at step 3, since the operating signal supplied to each of the second brake valves 30F, 30R is equal to or more than the first command value, it is determined that the braking by the second brake valves 30F, 30R is not performed, and the process goes to step 4. At step 4, it is determined whether or not the pressure of the hydraulic fluid detected by each of the pressure sensors 35F, 35R is equal to or more than a predetermined brake operating pressure (Pbth in FIG. 8).

In a case where "YES" is determined at step 4, although the operating signal for valve closing is supplied to each of the second brake valves 30F, 30R, the pressure equal to or more than the brake operating pressure is generated. In this case, since there is concern that the second brake valves 30F, 30R are not operated normally and the unintended braking is performed, the process goes to step 5.

At step 5, an operating signal to be supplied to each of the second solenoid switching valves 34F, 34R is set to the maximum value equal to or more than the third command value (Vesv1 in FIG. 7). Thereby, the second solenoid switching valves 34F, 34R are switched to the disconnection positions (d), (f). Accordingly, the second brake valves 30F, 30R are disconnected to the second accumulators 25F, 25R to stop the supply of the hydraulic fluid to the second brake valves 30F, 30R.

At subsequent step 6, an operating signal to be supplied to the first solenoid switching valve 32 is set to the maximum value equal to or more than the second command value (Vcsv1 in FIG. 6), and the process goes back to step 1. Thereby, the first solenoid switching valve 32 is switched to the disconnection position (b), and the second accumulator 25F is disconnected to the first shuttle valves 33F, 33R. Accordingly, the supply of the hydraulic fluid from the second accumulators 25F, 25R to the front brakes 18L, 18R and the rear brakes 20L, 20R is stopped. As a result, the dump truck 1 becomes in the non-braking state to release the braking, and is in a state of being able to travel.

In this way, since there is the concern that the unintended braking is performed by the abnormal operation of each of the second brake valves 30F, 30R, the controller 37 sets the operating signal to be supplied to each of the second solenoid switching valves 34F, 34R to the maximum value equal to or more than the third command value. Thereby, the second solenoid switching valves 34F, 34R are switched to the disconnection positions (d), (f), making it possible to disconnect the supply of the hydraulic fluid to the second brake valves 30F, 30R from the second accumulators 25F, 25R. As a result, the unintended braking of the dump truck 1 can be suppressed to enhance the reliability of the automatic brake subsystem 24.

It should be noted that even in a case where the braking by the automatic brake subsystem 24 is not performed, it is possible to perform the braking to the dump truck 1 by the manned brake subsystem 11 by depressing the brake pedal 23 by an operator, for example.

Meanwhile, in a case where "NO" is determined at step 4, the pressure of the hydraulic fluid detected by each of the pressure sensors 35F, 35R is less than the brake operating pressure. Accordingly, since the second brake valves 30F, 30R are operating normally, the process goes back to step 1.

Next, in a case where "NO" is determined at step 3, the operating signal supplied to each of the pressure sensors 35F, 35R is less than the first command value. Accordingly, it is determined that the hydraulic fluid is outputted through the second brake valves 30F, 30R, and the process goes to step 7.

At step 7, it is determined whether or not the pressure of the hydraulic fluid detected by each of the pressure sensors 35F, 35R is less than the brake operating pressure. In a case where "NO" is determined at step 7, the pressure of the hydraulic fluid to be supplied to each of the front brakes 18L, 18R and the rear brakes 20L, 20R is equal to or more than the brake operating pressure. Since the second brake valves 30F, 30R are operating normally in this case, the process goes back to step 1.

Meanwhile, in a case where "YES" is determined at step 7, although the operating signal for valve opening is supplied to each of the second brake valves 30F, 30R, the pressure of the hydraulic fluid to be supplied to each of the front brakes 18L, 18R and the rear brakes 20L, 20R is less than the brake operating pressure. Accordingly, there is the concern that the hydraulic fluid flows out into the tank 13 from the second brake valves 30F, 30R.

In this case, the process goes to step 8, the operating signal to be supplied to each of the second solenoid switching valves 34F, 34R is set to the maximum value equal to or more than the third command value. Thereby, the second solenoid switching valves 34F, 34R are switched to the disconnection positions (d), (f). Accordingly, the second brake valves 30F, 30R are disconnected to the second accumulators 25F, 25R to stop the supply of the hydraulic fluid to the second brake valves 30F, 30R.

At subsequent step 9, the operating signal to be supplied to the first solenoid switching valve 32 is set to the minimum value less than the second command value, and the process goes back to step 1. Thereby, the first solenoid switching valve 32 is switched to the communication position (a). Accordingly, the hydraulic fluid from each of the second accumulators 25F, 25R is supplied to the front brakes 18L, 18R and the rear brakes 20L, 20R through the first shuttle valves 33F, 33R and the second shuttle valves 36F, 36R from the first solenoid switching valve 32, to brake the dump truck 1.

In this way, in a case where there is the concern that the hydraulic fluid flows out into the tank 13 from the second brake valves 30F, 30R, the second brake valves 30F, 30R are disconnected from the second accumulators 25F, 25R. Thereby, it is possible to suppress the outflow of the hydraulic fluid from the second brake valves 30F, 30R. In this case, the hydraulic fluid from the second accumulator 25F is supplied to the front brakes 18L, 18R and the rear brakes 20L, 20R through the first solenoid switching valve 32 and the like to be capable of braking the dump truck 1.

In this way, according to the present embodiment, the automatic brake subsystem 24 includes the second accumulators 25F, 25R, the front second line 28 and the rear second line 29, the second brake valves 30F, 30R, the first solenoid switching valve 32, the first shuttle valves 33F, 33R, and the controller 37. The second solenoid switching valve 34F is provided between the second accumulator 25F and the second brake valve 30F in the front second line 28. The second solenoid switching valve 34R is provided between the second accumulator 25R and the second brake valve 30R in the rear second line 29. The pressure sensors 35F, 35R each are provided in the halfway of the front second line 28 and in the halfway of the rear second line 29. The controller 37 determines whether or not the operation of each of the second brake valves 30F, 30R is normal based upon the pressure of the hydraulic fluid detected by each of the pressure sensors 35F, 35R and the operating signal supplied to the first solenoid switching valve 32 or each of the second brake valves 30F, 30R. The controller 37 performs the control to switch the second solenoid switching valves 34F, 34R in a case where it is determined that the second brake valves 30F, 30R are not operating normally.

As the second brake valves 30F, 30R are abnormal at the time of not braking the dump truck 1 (at the non-braking), the pressure of the hydraulic fluid to be supplied to each of the front brakes 18L, 18R and the rear brakes 20L, 20R becomes equal to or more than the brake operating pressure. In this case, the controller 37 switches the second solenoid switching valves 34F, 34R to the disconnection positions (d), (f), whereby the second brake valves 30F, 30R can be disconnected from the second accumulators 25F, 25R. Accordingly, the hydraulic fluid from the second accumulators 25F, 25R is not supplied to the front brakes 18L, 18R and the rear brakes 20L, 20R through second brake valves 30F, 30R. As a result, it is possible to suppress the unintended braking from being performed by the abnormal operations of the second brake valves 30F, 30R.

Meanwhile, when the second brake valves 30F, 30R are abnormal at the time of braking the dump truck 1 (at the braking), the pressure of the hydraulic fluid to be supplied to the front brakes 18L, 18R and the rear brakes 20L, 20R becomes less than the brake operating pressure. In this case, the controller 37 switches the second solenoid switching valves 34F, 34R to the disconnection positions (d), (f), whereby the second brake valves 30F, 30R can be disconnected from the second accumulators 25F, 25R. In addition, the controller 37 switches the first solenoid switching valve 32 to the communication position (a), whereby the hydraulic fluid can be supplied to the front brakes 18L, 18R and the rear brakes 20L, 20R. Thereby, the hydraulic fluid from the second accumulators 25F, 25R can be suppressed from flowing out into the tank 13 through the second brake valves 30F, 30R. Accordingly, the pressure of the hydraulic fluid accumulated in the second accumulators 25F, 25R is kept, making it possible to perform the braking of the dump truck 1. As a result, the reliability of the automatic brake subsystem 24 can be enhanced.

In addition, in the present embodiment, the second brake valves 30F, 30R, the first solenoid switching valve 32 and the second solenoid switching valves 34F, 34R each are a solenoid valve of a normally open type that automatically returns to the communication position in the electricity disconnected state where the operating signal is not inputted from the controller 37.

In a case of braking the vehicle body 2 of the dump truck 1 by the automatic brake subsystem 24, there are some cases where the operating signal is not outputted from the controller 37 due to occurrence of the power source failure, for example. Even in this case, the hydraulic fluids from the second accumulators 25F, 25R are supplied to the front brakes 18L, 18R and the rear brakes 20L, 20R through the second brake valves 30F, 30R, the first solenoid switching valve 32 and the second solenoid switching valves 34F, 34R, which hold the communication position, and the like. Accordingly, it is possible to securely perform the braking of the dump truck 1.

It should be noted that the embodiment shows a case where one end of the branch line 31 is connected to the halfway of the front second line 28 as an example. However, the present invention is not limited thereto, but, for example, one end of the branch line 31 may be connected to the halfway of the rear second line 29 between the second accumulator 25R and the second brake valve 30R.

In addition, the embodiment shows a case where the brake operating pressure (the threshold value) of the hydraulic fluid to be supplied to each of the front brakes 18L, 18R and the rear brakes 20L, 20R is set to a single value (Pbth in FIG. 8) as an example. However, the present invention is not limited thereto, but, for example, the brake operating pressure of the hydraulic fluid to be supplied to the front brakes 18L, 18R may be different from the brake operating pressure of the hydraulic fluid to be supplied to the rear brakes 20L, 20R. In addition, the brake operating pressure of the hydraulic fluid may change as needed depending upon the structure of the brake, the configuration of the line (the line length) connected to the brake, and the like.

Further, in the embodiment, the brake operating pressure (the threshold value) of the hydraulic fluid to be supplied to each of the front brakes 18L, 18R and the rear brakes 20L, 20R is set by a single value (the brake operating pressure at time t1 in FIG. 8) corresponding to a constant elapse time. However, the present invention is not limited thereto, but a different brake operating pressure may be set for each of a plurality of elapsed times and the operating state of each of the second brake valves 30F, 30R may be determined based upon each of the plurality of brake operating pressures.

DESCRIPTION OF REFERENCE NUMERALS

2: Vehicle body
6: Engine
11: Manned brake subsystem
12: Hydraulic pump (Fluid pump)
15F, 15R: First accumulator
18L, 18R: Front brake (Brake)
19: Front first line (First line)
20L, 20R: Rear brake (Brake)
21: Rear first line (First line)
22F, 22R: First brake valve
23: Brake pedal
24: Automatic brake subsystem
25F, 25R: Second accumulator
28: Front second line (Second line)
29: Rear second line (Second line)
30F, 30R: Second brake valve
32: First solenoid switching valve
33F, 33R: First shuttle valve (Control brake pressure selective valve)
34F, 34R: Second solenoid switching valve
35F, 35R: Pressure sensor (Pressure detector)
37: Controller (Control device)

The invention claimed is:

1. A brake system comprising:
an engine mounted on a vehicle body;
a manned brake subsystem performing a braking of the vehicle body with an operation of an operator; and
an automatic brake subsystem performing the braking of the vehicle body without through the operator, wherein
the manned brake subsystem includes:
a fluid pump driven by the engine;
a first accumulator accumulating a hydraulic fluid to be supplied from the fluid pump;
a brake operated by the hydraulic fluid accumulated in the first accumulator;
a first brake valve that is provided in a first line for connection of the brake and the first accumulator and controls supply and discharge of the hydraulic fluid from the first accumulator toward the brake; and
a brake pedal operated to open and close the first brake valve, and
the manned brake subsystem operates the brake in response to the operation of the operator, and
the automatic brake subsystem includes:
a second accumulator accumulating the hydraulic fluid to be supplied from the fluid pump;
a second brake valve that is provided in a second line for connection of the brake and the second accumulator and controls supply and discharge of the hydraulic fluid from the second accumulator toward the brake;
a first solenoid switching valve that is connected to the second accumulator to be in parallel with the second brake valve and controls supply and discharge of the hydraulic fluid between the second accumulator and the brake;
a control device configured to control operations of the second brake valve and the first solenoid switching valve; and
a control brake selective valve that selects a hydraulic fluid higher in pressure out of hydraulic fluids to be supplied from the second brake valve and the first solenoid switching valve to be outputted to the brake, and
the automatic brake subsystem operates the brake in response to an operating signal from the control device, characterized in that:
a second solenoid switching valve is provided between the second accumulator and the second brake valve in the second line to connect the second brake valve and any one of the second accumulator and a tank of the hydraulic fluid; and
a pressure detector is provided between the control brake pressure selective valve and the brake in the second line to detect a pressure of the hydraulic fluid,
wherein when the pressure of the hydraulic fluid detected by the pressure detector is equal to or more than a brake operating pressure in which the brake operates in a state where an operating signal for valve closing is supplied to the second brake valve, and when the pressure of the hydraulic fluid detected by the pressure detector is less than the brake operating pressure in a state where an operating signal for valve opening is supplied to the second brake valve, the control device performs control to switch the second solenoid switching valve to a position in which the second brake valve is disconnected from the second accumulator and is connected to the tank.

2. The brake system according to claim 1, wherein the second brake valve, the first solenoid switching valve and the second solenoid switching valve each include a solenoid valve of a normally open type automatically returning to a communication position in an electricity disconnected state in which the operating signal to the solenoid valve is not inputted.

* * * * *